United States Patent
Mital et al.

(10) Patent No.: US 6,922,987 B2
(45) Date of Patent: Aug. 2, 2005

(54) SYSTEM AND METHOD FOR ENHANCING INTERNAL COMBUSTION ENGINE AFTERTREATMENT APPLICATIONS BY SUPERHEATED FUEL INJECTION

(75) Inventors: Rahul Mital, Columbus, IN (US); Scott Cole, Columbus, IN (US); Robert C. Yu, Columbus, IN (US); Mike Nagel, Nashville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/364,986

(22) Filed: Feb. 12, 2003

(65) Prior Publication Data

US 2004/0154287 A1 Aug. 12, 2004

(51) Int. Cl.⁷ .................................................. F01N 3/00
(52) U.S. Cl. ............................. 60/286; 60/295; 60/303
(58) Field of Search ........................ 60/274, 286, 295, 60/303, 309; 96/243, 361

(56) References Cited

U.S. PATENT DOCUMENTS

| | | | |
|---|---|---|---|
| 3,988,890 A | | 11/1976 | Abthoff et al. |
| 4,719,751 A | | 1/1988 | Kume et al. |
| 5,282,355 A | | 2/1994 | Yamaguchi |
| 5,370,720 A | * | 12/1994 | Duncan .................... 96/361 |
| 5,381,659 A | | 1/1995 | Loving et al. |
| 5,381,660 A | | 1/1995 | Loving et al. |
| 5,397,550 A | | 3/1995 | Marino, Jr. |
| 5,449,390 A | * | 9/1995 | Duncan et al. ............... 96/243 |
| 5,634,330 A | | 6/1997 | Achleitner et al. |
| 5,673,555 A | | 10/1997 | Achleitner |
| 5,845,487 A | | 12/1998 | Fraenkle et al. |
| 5,884,475 A | * | 3/1999 | Hofmann et al. ............. 60/274 |
| 5,907,950 A | | 6/1999 | Enderle et al. |
| 6,041,594 A | * | 3/2000 | Brenner et al. ................ 60/309 |
| 6,076,348 A | | 6/2000 | Falandino et al. |
| 6,173,568 B1 | * | 1/2001 | Zurbig et al. ................. 60/274 |
| 6,264,899 B1 | | 7/2001 | Caren et al. |
| 6,269,633 B1 | | 8/2001 | van Nieuwstadt et al. |
| 6,330,794 B1 | | 12/2001 | Caren et al. |
| 2001/0049936 A1 | | 12/2001 | Kenneth et al. |
| 2002/0134074 A1 | * | 9/2002 | Huthwohl et al. ............ 60/286 |
| 2003/0101715 A1 | * | 6/2003 | Huthwohl ..................... 60/286 |
| 2004/0025498 A1 | * | 2/2004 | Lambert et al. .............. 60/286 |

FOREIGN PATENT DOCUMENTS

| | | |
|---|---|---|
| JP | 06066208 | 3/1994 |
| WO | WO 96/06303 | 2/1996 |

* cited by examiner

*Primary Examiner*—Tu M. Nguyen
(74) *Attorney, Agent, or Firm*—Woodard, Emhardt, Moriarty, McNett & Henry LLP

(57) ABSTRACT

The present invention provides for a system and process for enhancing internal combustion engine aftertreatment applications by superheated fuel injection. The system includes a fuel supply upstream of a fuel injector of an aftertreatment application. The system also includes a heater for heating the fuel in the fuel supply. A temperature controller can be used to maintain the heated fuel in a liquid form. When liquid fuel in the pressurized fuel supply is heated, then upon exiting the injector the pressure of the fuel drops rapidly, resulting in atomization of the liquid. The vaporized fuel thereby produced is comprised of extremely small droplets and is elevated in temperature, which reduces the possibility of condensation on internal surfaces of the aftertreatment system. This fine droplet size and resistance to condensation enhances the NOx conversion efficiency of adsorbers. Problems related to premature aging of catalysts and fuel penalties can also be reduced.

6 Claims, 4 Drawing Sheets

SYSTEM AND METHOD FOR ENHANCING INTERNAL COMBUSTION ENGINE AFTERTREATMENT APPLICATIONS BY SUPERHEATED FUEL INJECTION

TECHNICAL FIELD OF THE INVENTION

The present invention generally relates to internal combustion engines and, more particularly, to a system and method for enhancing internal combustion engine aftertreatment applications by superheated fuel injection.

BACKGROUND OF THE INVENTION

As environmental concerns have led to increasingly strict regulation of engine emissions by governmental agencies, reduction of nitrogen-oxygen compounds (NOx) in exhaust emissions from internal combustion engines has become increasingly important. Current indications are that this trend will continue.

Future emission levels of diesel engines will have to be reduced in order to meet Environmental Protection Agency (EPA) regulated levels. In the past, the emission levels of US diesel engines have been regulated according to the EPA using the Federal Test Procedure (FTP) cycle, with a subset of more restrictive emission standards for California via the California Air Resources Board (CARB). For example, the Tier II emission standards, which are being considered for 2004, are 50% lower than the Tier I standards. Car and light truck emissions are measured over the FTP 75 test and expressed in gm/mi. Proposed Ultra-Low Emissions Vehicle (ULEV) emission levels for light-duty vehicles up to model year 2004 are 0.2 gm/mi NOx and 0.08 gm/mi particulate matter (PM). Beginning with the 2004 model year, all light-duty Low Emission Vehicles (LEVs) and ULEVs in California would have to meet a 0.05 gm/mi NOx standard to be phased in over a three year period. In addition to the NOx standard, a full useful life PM standard of 0.01 gm/mi would also have to be met.

Traditional methods of in-cylinder emission reduction techniques such as exhaust gas recirculation (EGR) and injection rate shaping by themselves will not be able to achieve these low emission levels required by the standard. Aftertreatment technologies will have to be used, and will have to be further developed in order to meet the future low emission requirements of the diesel engine.

NOx adsorber catalysts have the potential for great NOx emission reduction (70–90%) and for extending engine life. However, low temperature operation of adsorbers seems to be a problem. The main reason for this problem seems to be the fact that the reductants, especially D2 fuel, starts to boil at around 180 degrees Celsius. At temperatures below this, the injected fuel has a strong tendency to condense and does not participate in the release and reduction step of NOx adsorbers (catalytic converters). Also, if the droplet size is large, atomization is not good and the fuel does not vaporize easily even at the higher temperature, thereby limiting adsorber performance.

Current devices on their own, such as spraying system nozzles and injectors cannot do anything about the condensation at low temperature. Also, the droplet size measurement shows that they have a sauter mean diameter (SMD) in the range of 30–60 $\mu$m. If this droplet size can be reduced further, the vaporization will become faster and easier. This will improve the reductant participation in the catalyst reactions and improve the NOx adsorber capacity and NOx conversion efficiency.

There is therefore a need for a system and method for enhancing internal combustion engine aftertreatment applications that can reduce emission levels for diesel engines. The present invention is directed toward meeting this need.

SUMMARY OF THE INVENTION

It is an object of the present invention to provide a system and process for enhancing internal combustion engine aftertreatment applications by superheated fuel injection. It is a further object of the present invention to provide a system and process for reducing emission levels of diesel engines.

These objects and others are achieved by various forms of the present invention. According to one aspect of the invention, a system and process for enhancing internal combustion engine aftertreatment applications by superheated fuel injection is disclosed. The system includes a fuel supply upstream of a pressurized fuel injector or nozzle of an aftertreatment application. The system also includes a heater for heating the fuel in the pressurized fuel supply to a desired temperature. A temperature controller can be used to maintain the heated fuel in a liquid form. When liquid fuel in the pressurized fuel supply is heated, the pressure of the fuel drops rapidly upon exiting the injector, resulting in atomization of the liquid. The vaporized fuel thereby produced is comprised of extremely small droplets and is elevated in temperature, which reduces the possibility of condensation on internal surfaces of the aftertreatment system. This fine droplet size and resistance to condensation enhances the NOx conversion efficiency of adsorbers. Premature aging of catalysts due to hydrocarbon masking, especially at low temperatures, is also avoided. In addition, the fuel penalty is reduced due to better hydrocarbon utilization.

In another aspect of the invention, a system for enhancing internal combustion engine aftertreatment applications by superheated fuel injection is disclosed, comprising a heater for heating fuel to a point where the fuel vaporizes when injected into an exhaust stream.

In yet another aspect of the invention, a system for enhancing internal combustion engine aftertreatment applications by superheated fuel injection is disclosed, comprising: a NOx adsorber; a nozzle operatively coupled to the NOx adsorber; a pressurized fuel supply located upstream of the nozzle; and a heater operatively coupled to the pressurized fuel supply for heating fuel in the pressurized fuel supply so the fuel vaporizes when injected by the nozzle into the NOx adsorber.

According to a still further aspect of the invention, a method for enhancing internal combustion engine aftertreatment applications by superheated fuel injection is disclosed, comprising: (a) pressurizing a fuel in a pressurized fuel supply while keeping the fuel in liquid form; (b) heating the fuel in the pressurized fuel supply with a heater; and (c) injecting the fuel into an exhaust stream, at which point the fuel becomes vaporized into small droplets due to a sudden decrease in pressure.

DETAILED DESCRIPTION OF THE PREFERRED EMBODIMENTS

Figure 1:
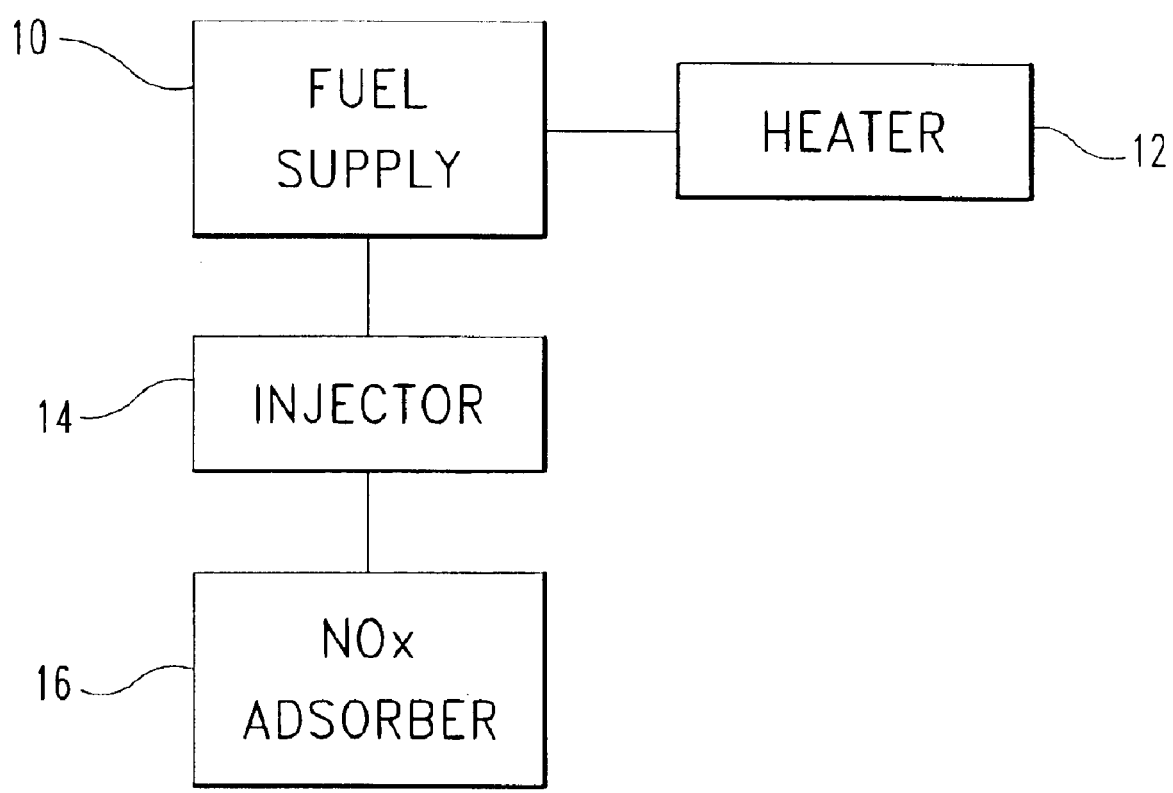
FIG. 1 is a schematic block diagram of a preferred embodiment system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present invention provides a system and method for enhancing internal combustion engine aftertreatment applications by superheated fuel injection.

Referring to FIG. 1, there is illustrated a schematic block diagram of a preferred embodiment system of the present invention. The system includes a pressurized fuel supply 10 for supplying fuel to an aftertreatment application. A heater 12 is coupled to the pressurized fuel supply 10 for heating the fuel in the fuel supply 10. A variety of heater types, both with or without thermostatic feedback control, may be used for heater 12. In the preferred embodiment, 150 W heating tape is used. The fuel supply 10 is coupled to a fuel injector 14 or nozzle. The distance between the fuel supply 10 and the fuel injector 14 is preferably minimized to avoid heat loss. The fuel injector 14 is coupled to a NOx adsorber 16 and is operative to selectively inject fuel into the adsorber 16.

Figure 2:
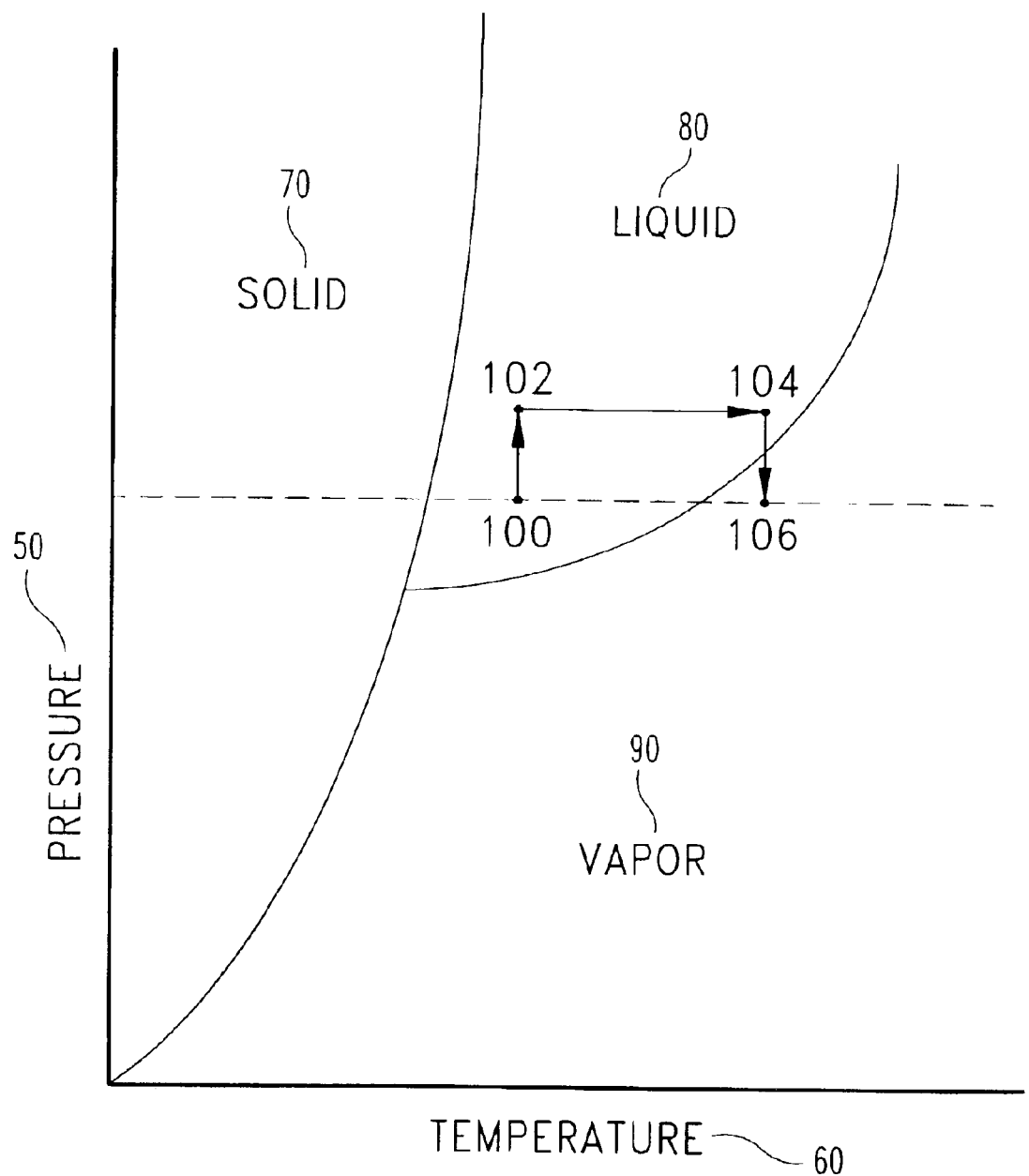
FIG. 2 is a phase diagram showing how the fuel changes from a liquid to a vapor in a preferred embodiment system of the present invention.

Referring now to FIG. 2, there is shown a phase diagram illustrating how the fuel changes from a liquid to a vapor in a preferred embodiment system of the present invention. The temperature 60 of the fuel is represented on the horizontal axis, whereas the pressure 50 of the fuel is represented on the vertical axis. The diagram demonstrates that depending on the combination of pressure 50 and temperature 60, the fuel can change from a solid form 70, to a liquid form 80, or to a vapor form 90.

Figure 3:
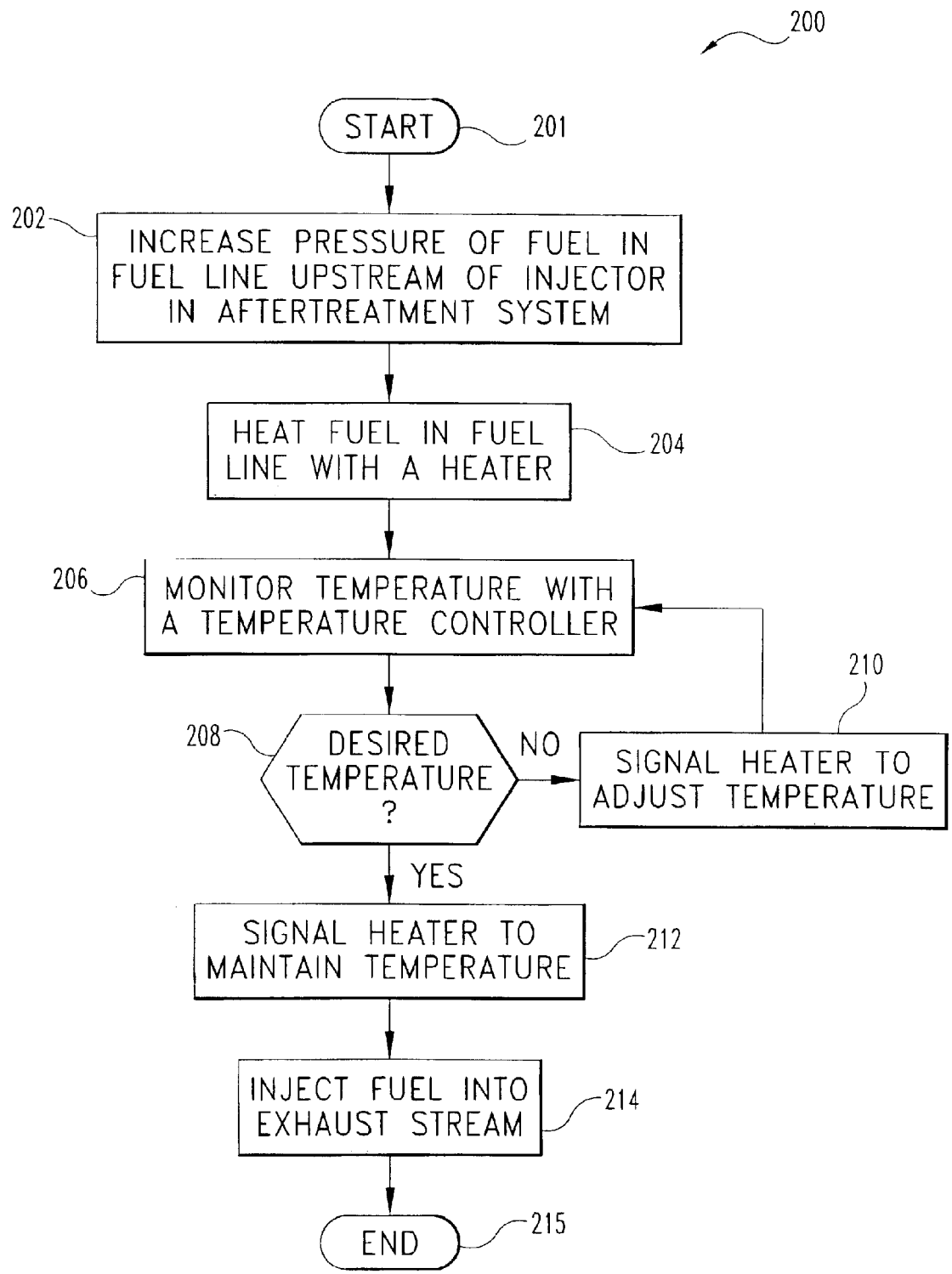
FIG. 3 is a process flow diagram illustrating a preferred embodiment process of the present invention.

FIG. 3 illustrates a preferred embodiment process of the present invention. The process shown in FIG. 3 will now be described in detail, with continuing reference to FIGS. 1–2. The process 200 begins at start point 201 and the pressure of the fuel is increased in a pressurized fuel supply (step 202), while keeping the temperature in the liquid range. At the increased pressure, the fuel moves from point 100 (room temperature) to point 102 in the liquid region. When fuel is at a higher pressure, the boiling point rises. The fuel in the fuel supply 10 is then heated with a heater 12 (step 204) upstream of the injector 14, to point 104 where it is still in the liquid region. Keeping the fuel in the pressurized fuel supply in liquid state prevents any vapor lock in the lines. The temperature of the fuel can be monitored with a temperature controller (step 206) to ensure the desired liquid state temperature is maintained. If the temperature is not as desired (step 208), the temperature controller signals to the heater 12 to adjust the heating accordingly (step 210). Once the desired temperature is achieved (step 208), the temperature controller signals the heater to maintain the temperature (step 212). It is not required that the fuel temperature remain constant while in the pressurized fuel supply, only that the fuel temperature be maintained in the liquid range prior to injection.

The heated, yet still liquid, fuel is then injected by the fuel injector 14 into the NOx adsorber 16 of the exhaust stream (step 214). As the fuel comes out of the injector 14, it experiences sudden expansion and atomizes in a fine mist due to the sudden decrease in pressure. The fuel thus moves from point 104 in the liquid region to point 106 in the vapor region. The fuel almost instantaneously breaks up into sub-micron size droplets. The droplet size of this fine mist is below Malvern measuring capability. The temperature of the fuel is still elevated higher than the saturation vapor pressure, which resists instant condensation even when injected into a system at a lower temperature. This allows the catalyst to combust the fuel more efficiently for heat release and to participate in NOx reduction reactions. The process then ends at point 215.

Note that without the heating step, point 102 just comes back to point 100 during the injection process. This is undesirable because, as described in the background section, the injected fuel has a strong tendency to condense and does not participate in the release and reduction step of NOx adsorbers.

Figure 4:
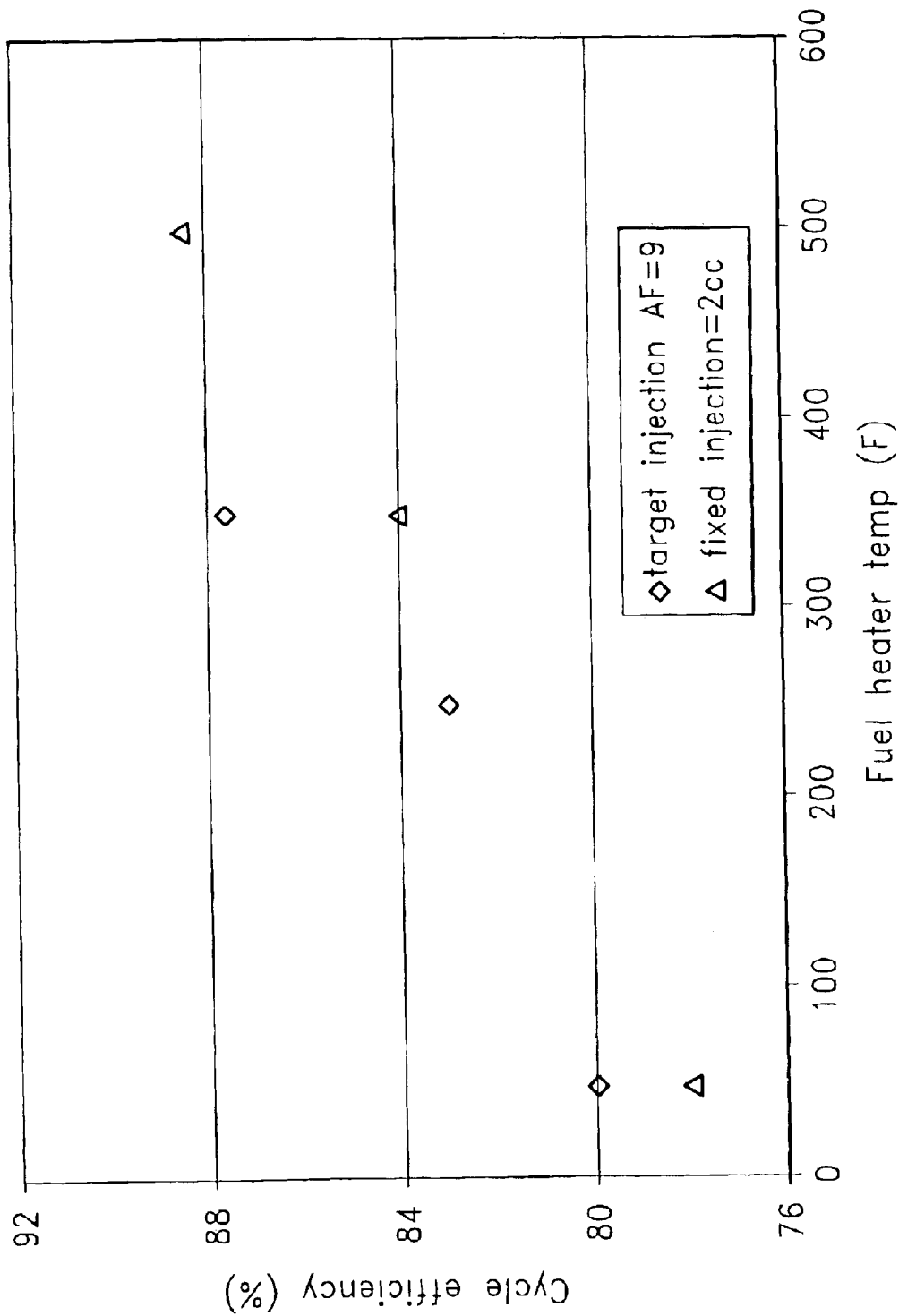
FIG. 4 is a diagram illustrating the effect of injected fuel temperature on NOx conversion efficiency.

As shown in FIG. 4, a higher cycle efficiency is achieved by super heating the fuel prior to injection.

Some advantages to the system and method for enhancing internal combustion engine aftertreatment applications presented in the present invention therefore include: (1) The NOx conversion efficiency (catalyst activity) is greatly improved. (2) The superheated fuel resists instant condensation, which allows longer reaction time on the catalyst surface. (3) Premature aging of catalysts due to hydrocarbon masking, especially at low temperatures, is avoided. (4) The fuel penalty is reduced due to improved hydrocarbon utilization. (5) Cold start conditions or cold operation may be improved.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for enhancing internal combustion engine aftertreatment applications by superheated fuel injection comprising:
    a NOx adsorber;
    a nozzle operatively coupled to the NOx adsorber;
    a pressurized fuel supply located upstream of the nozzle; and
    a heater operatively coupled to the pressurized fuel supply for super heating fuel in the pressurized fuel supply so the fuel vaporizes when injected by the nozzle into the NOx adsorber.

2. The system of claim 1 wherein the distance between an end of the pressurized fuel supply and the nozzle is minimized to avoid heat loss.

3. The system of claim 1 wherein the heater is a heating tape.

4. The system of claim 1 further comprising:
    a temperature controller operatively coupled to the heater for maintaining the fuel at a temperature that keeps the fuel in a liquid form until injection into the NOx adsorber.

5. The system of claim 1 wherein the nozzle is a fuel injector.

6. The system of claim 1 wherein the vaporized fuel is in sub-micron size droplets.

* * * * *